United States Patent
Chen et al.

(10) Patent No.: US 10,146,074 B2
(45) Date of Patent: Dec. 4, 2018

(54) LIQUID CRYSTAL DEVICE (LCD) AND THE MANUFACTURING METHOD THEREOF

(71) Applicant: Shenzhen China Star Optoelectronics Technology Co., Ltd., Shenzhen, Guangdong (CN)

(72) Inventors: Cheng-hung Chen, Guangdong (CN); Jiali Jiang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 206 days.

(21) Appl. No.: 14/892,668

(22) PCT Filed: Oct. 21, 2015

(86) PCT No.: PCT/CN2015/092352
§ 371 (c)(1),
(2) Date: Nov. 20, 2015

(87) PCT Pub. No.: WO2017/059606
PCT Pub. Date: Apr. 13, 2017

(65) Prior Publication Data
US 2017/0212376 A1    Jul. 27, 2017

(30) Foreign Application Priority Data

Oct. 10, 2015 (CN) .......................... 2015 1 0654022

(51) Int. Cl.
*G02F 1/133* (2006.01)
*G02F 1/1345* (2006.01)
(Continued)

(52) U.S. Cl.
CPC ........ *G02F 1/13306* (2013.01); *G02F 1/1345* (2013.01); *G02F 1/1368* (2013.01);
(Continued)

(58) Field of Classification Search
CPC ... G02F 1/134363; G02F 2001/134381; G02F 1/13306
(Continued)

(56) References Cited

U.S. PATENT DOCUMENTS

2013/0314656 A1    11/2013  Ma et al.
2013/0337716 A1    11/2013  Wang et al.
(Continued)

FOREIGN PATENT DOCUMENTS

CN      103941491 A      7/2014
KR      20130131692 A    12/2013

*Primary Examiner* — Thanh-Nhan P Nguyen
(74) *Attorney, Agent, or Firm* — Andrew C. Cheng

(57) ABSTRACT

A liquid crystal device (LCD) and a flexible circuit board are disclosed. The display panel includes a color film substrate, an array substrate, and a liquid crystal layer between the color film substrate and the array substrate. The flexible circuit board is configured for arranging the driving circuit. before the flexible circuit board is bonded, a common voltage of the color film substrate and the common voltage of the array substrate are disconnected. A voltage of the pixel electrode of the array substrate and the common voltage of the color film substrate are independent signals and are independently controllable to form a predetermined voltage difference for aligning the liquid crystal layer between the array substrate and the color film substrate. As such, the voltage difference for aligning the liquid crystal layer between the color film substrate and the array substrate of the self-adjust Vcom LCD may be formed.

10 Claims, 5 Drawing Sheets

(51) Int. Cl.
   *G02F 1/1335* (2006.01)
   *G02F 1/1343* (2006.01)
   *G02F 1/1362* (2006.01)
   *G02F 1/1368* (2006.01)
   *G02F 1/1337* (2006.01)

(52) U.S. Cl.
   CPC .. *G02F 1/133514* (2013.01); *G02F 1/133788* (2013.01); *G02F 1/134309* (2013.01); *G02F 1/134336* (2013.01); *G02F 1/136213* (2013.01); *G02F 1/136286* (2013.01); *G02F 2201/121* (2013.01); *G02F 2201/123* (2013.01)

(58) Field of Classification Search
   USPC ......................................................... 349/141
   See application file for complete search history.

(56) References Cited

U.S. PATENT DOCUMENTS

| | | |
|---|---|---|
| 2014/0055733 A1 | 2/2014 | Gu et al. |
| 2016/0231603 A1 | 8/2016 | Zhang et al. |
| 2016/0259197 A1 | 9/2016 | Huang et al. |
| 2016/0282671 A1 | 9/2016 | Han et al. |

LIQUID CRYSTAL DEVICE (LCD) AND THE MANUFACTURING METHOD THEREOF

BACKGROUND OF THE INVENTION

1. Field of the Invention

The present disclosure relates to liquid crystal display technology, and more particularly to a LCD and the manufacturing method thereof.

2. Discussion of the Related Art

There are two main display technologies including In-Plane Switching (IPS) and Vertical Alignment (VA). VA alignment LCDs are characterized by attributes such as quick response time and high contrastness, and thus have been widely adopted.

Conventionally, a transfer pad is configured in a rim of the display panel of the LCD for connecting the Array-Vcom on the array substrate and the CF-Vcom on the color film substrate. After the alignment of the liquid crystal molecules are cured, usually, the scanning lines connected with the sub-pixels are charged or turn on, and the data lines connected with the sub-pixels are grounded. At the same time, the Array-Vcom of the array substrate receives alternating signals or other signals suitable for conducting the curing. As such, the level of the pixel electrode of the sub-pixels and the data line are maintained to be the ground level. The CF-Vcom of the color film substrate and the Array-Vcom of the array substrate are maintained to be the alternating signals, such that an appropriate voltage difference is generated at two ends of the liquid crystal layer, which is arranged between the pixel electrode of the sub-pixels and the common electrode of the color film substrate. The liquid crystal molecules may be aligned in accordance with the pretile angel, and thus the alignment of the liquid crystal layer may be cured under appropriate radiation.

Recently, self-adjust Vcom LCDs have been developed. The common voltage of the array substrate is performed by a functional circuit module, which respectively connects, directly or indirectly, to the pixel electrodes, data lines, and common voltage corresponding to the sub-pixels of the array substrate. At this moment, the change of the common voltage of the array substrate may directly affect the voltage change of the pixel electrode. The voltage difference between the pixel electrode and the color film substrate may not be appropriate for the alignment of the liquid crystal layer, which results in undesirable alignment or the alignment cannot be conducted.

In view of the above, after the liquid crystal panel is assembled, the solution of adopting the transfer pad to connect the common voltage on the array substrate and the common voltage on the color film substrate cannot satisfy the alignment requirement of the self-adjust Vcom LCDs.

SUMMARY

The object of the invention is to provide a LCD and the manufacturing method thereof. With such configuration, stable voltage difference for liquid crystal alignment may be formed between the color film substrate and the array substrate In one aspect, a liquid crystal device (LCD), includes: a display panel and a flexible circuit board, the display panel includes a color film substrate, an array substrate, and a liquid crystal layer between the color film substrate and the array substrate, the flexible circuit board is configured for arranging the driving circuit, at least one pixel electrode and at least one common electrode are arranged on an up surface of the array substrate, wherein the common electrode is insulated from the pixel electrode, a surface of the color film substrate is arranged with a common electrode, after the color film substrate, the array substrate, and the liquid crystal layer are assembled and before the flexible circuit board is bonded, a common voltage of the color film substrate and the common voltage of the array substrate are disconnected, a voltage of the pixel electrode of the array substrate and the common voltage of the color film substrate are independent signals and are independently controllable to form a predetermined voltage difference for aligning the liquid crystal layer between the array substrate and the color film substrate.

Wherein the predetermined voltage difference for aligning the liquid crystal layer is formed between the array substrate and the color film substrate, after the liquid crystal layer is aligned and the display panel is bonded, the common voltage of the color film substrate and the common voltage of the array substrate are connected.

Wherein the flexible circuit board includes a first pin and a second pin, the first pin receives the common voltage of the array substrate, and the second pin receives the common voltage of the color film substrate, after the flexible circuit board is bonded, the common voltage of the color film substrate and the common voltage of the array substrate are connected.

Wherein the flexible circuit board includes a plurality of source sub-flexible circuit boards and a plurality of gate sub-flexible circuit boards, at least one of the sub-flexible circuit boards includes interconnecting first pin and the second pin.

Wherein the array substrate includes a plurality of pixel field effect transistors and a plurality of pixel electrodes arranged in a matrix defined by a column direction and a row direction, a plurality of data lines arranged along the column direction and a plurality of scanning lines arranged along the row direction, each of the pixel field effect transistors includes a gate, a source, and a drain, the gate connects the corresponding scanning line to receive driving signals on the gate sub-flexible circuit boards of corresponding column, the source connects to the corresponding data line to receive the driving signals on the source sub-flexible circuit boards of corresponding row, and the drain connects to the corresponding pixel electrode, wherein the liquid crystal molecules within the liquid crystal layer between the pixel electrode and the color film substrate form at least one liquid crystal capacitor, one end of the liquid crystal capacitor connects to the pixel electrode, the other end of the liquid crystal capacitor receives the common voltage of the color film substrate, after the color film substrate, the array substrate, and the liquid crystal layer are assembled and before bonding with the flexible circuit board, the gate of each of the field effect transistors are turned on by the gate sub-flexible circuit boards, and the first voltage is inputted to the corresponding data line via the corresponding source sub-flexible circuit boards, such that the voltage of the corresponding pixel electrode is the first voltage, at the same time, the second voltage is inputted to the common voltage on the color film substrate such that the predetermined AC voltage is formed at two ends of the liquid crystal layer.

In another aspect, a LCD, includes: a display panel and a flexible circuit board, the display panel includes a color film substrate, an array substrate, and a liquid crystal layer between the color film substrate and the array substrate, the flexible circuit board is configured for arranging the driving circuit, after the color film substrate, the array substrate, and the liquid crystal layer are assembled and before the flexible circuit board is bonded, a common voltage of the color film substrate and the common voltage of the array substrate are disconnected, a voltage of the pixel electrode of the array substrate and the common voltage of the color film substrate are independent signals and are independently controllable to form a predetermined voltage difference for aligning the liquid crystal layer between the array substrate and the color film substrate.

Wherein the predetermined voltage difference for aligning the liquid crystal layer is formed between the array substrate and the color film substrate, after the liquid crystal layer is aligned and the display panel is bonded, the common voltage of the color film substrate and the common voltage of the array substrate are connected.

Wherein the flexible circuit board includes a first pin and a second pin, the first pin receives the common voltage of the array substrate, and the second pin receives the common voltage of the color film substrate, after the flexible circuit board is bonded, the common voltage of the color film substrate and the common voltage of the array substrate are connected.

Wherein the flexible circuit board includes a plurality of source sub-flexible circuit boards and a plurality of gate sub-flexible circuit boards, at least one of the sub-flexible circuit boards includes interconnecting first pin and the second pin.

Wherein the array substrate includes a plurality of pixel field effect transistors and a plurality of pixel electrodes arranged in a matrix defined by a column direction and a row direction, a plurality of data lines arranged along the column direction and a plurality of scanning lines arranged along the row direction, each of the pixel field effect transistors includes a gate, a source, and a drain, the gate connects the corresponding scanning line to receive driving signals on the gate sub-flexible circuit boards of corresponding column, the source connects to the corresponding data line to receive the driving signals on the source sub-flexible circuit boards of corresponding row, and the drain connects to the corresponding pixel electrode, wherein the liquid crystal molecules within the liquid crystal layer between the pixel electrode and the color film substrate form at least one liquid crystal capacitor, one end of the liquid crystal capacitor connects to the pixel electrode, the other end of the liquid crystal capacitor receives the common voltage of the color film substrate, after the color film substrate, the array substrate, and the liquid crystal layer are assembled and before bonding with the flexible circuit board, the gate of each of the field effect transistors are turned on by the gate sub-flexible circuit boards, and the first voltage is inputted to the corresponding data line via the corresponding source sub-flexible circuit boards, such that the voltage of the corresponding pixel electrode is the first voltage, at the same time, the second voltage is inputted to the common voltage on the color film substrate such that the predetermined AC voltage is formed at two ends of the liquid crystal layer.

In another aspect, a manufacturing method of the LCDs, includes: assembling a color film substrate, an array substrate, and a liquid crystal layer; configuring a common voltage of the array substrate and the common voltage of the color film substrate to be disconnected such that a voltage of a pixel electrode of the array substrate and the common voltage of the color film substrate are independent signals and are independently controllable; and during an alignment process, respectively controlling the voltage of the pixel electrode and the common voltage of the color film substrate to form a predetermined voltage difference implementing the alignment of the liquid crystal layer between the array substrate and the color film substrate.

Wherein after the step of forming the predetermined voltage difference implementing the alignment of the liquid crystal layer between the array substrate and the color film substrate, the method further includes: radiating the liquid crystal layer with the predetermined voltage difference such that the liquid crystal molecules are cured and aligned in accordance with a predetermined pretile angle; bonding the display panel and the flexible circuit board; and connecting the common voltage of the array substrate and the common voltage of the color film substrate.

Wherein the step of the connecting the common voltage of the array substrate and the common voltage of the color film substrate further includes: arranging a first pin and a second pin connected with each other on the flexible circuit board; receiving the common voltage of the array substrate via the first pin; and receiving the common voltage of the color film substrate via the second pin.

Wherein the step of arranging the first pin and the second pin connected with each other on the flexible circuit board further includes: configuring the flexible circuit board to include a plurality of source sub-flexible circuit boards and gate sub-flexible circuit boards; and configuring at least one of the source sub-flexible circuit boards and the gate sub-flexible circuit boards to include the first pin and the second pin that are connected with each other.

Wherein the step of respectively controlling the voltage of the pixel electrode and the common voltage of the color film substrate to form a predetermined voltage difference implementing the alignment of the liquid crystal layer between the array substrate and the color film substrate further includes: turning on gates of each of the pixel FETS on the array substrate by the gate sub-flexible circuit boards; inputting a first voltage to the corresponding data line of the pixel FET by the source sub-flexible circuit boards such that the voltage of the pixel electrode connected with the pixel FET is the first voltage, at the same time, the common voltage of the color film substrate receives the second voltage to form a predetermined AC voltage on the liquid crystal layer.

In view of the above, after the color film substrate, the array substrate, and the liquid crystal layer are assembled and before being bonded with the flexible circuit board, the common voltage of the color film substrate and the common voltage of the array substrate are disconnected. The voltage of the pixel electrode of the array substrate and the CF-Vcom of the color film substrate are independent signals and can be independently controllable, and thus may be adopted to realize a predetermined voltage difference for aligning the liquid crystal layer between the array substrate and the color film substrate. Further, after the alignment process, the display panel and the flexible circuit board are bonded, the common voltage of the color film substrate and the common voltage of the array substrate are connected so as to normally display. Compared to the conventional technology, after the liquid crystal panel is assembled and before the flexible circuit board are bonded, the voltage of the pixel electrode of the array substrate and the CF-Vcom of the color film substrate are independent signals and can be independently controllable, and thus may be adopted to realize a predetermined voltage difference for aligning the liquid crystal layer between the array substrate and the color film substrate. In this way, the display performance is enhanced.

DETAILED DESCRIPTION OF THE EMBODIMENTS

Embodiments of the invention will now be described more fully hereinafter with reference to the accompanying drawings, in which embodiments of the invention are shown.

Figure 1:
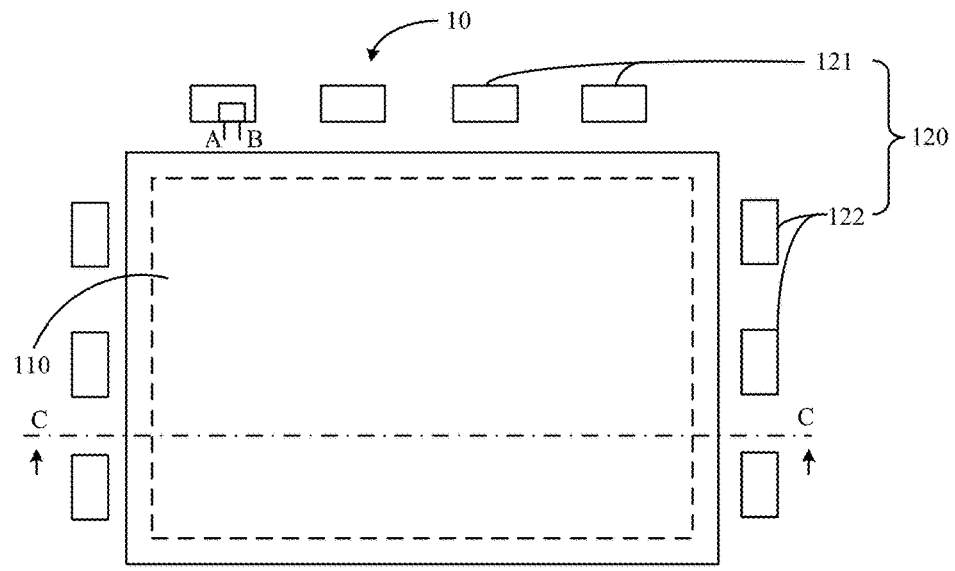
FIG. 1 is a schematic view of the LCD in accordance with one embodiment.
Figure 2:
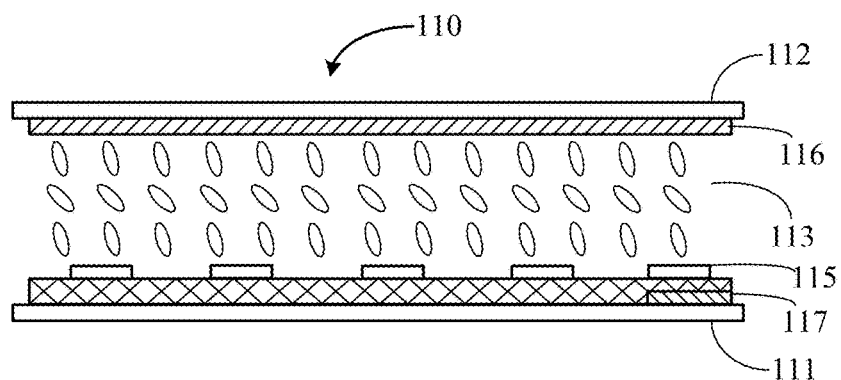
FIG. 2 is a cross-sectional view of the display panel of FIG. 1 along the "C-C" line.

FIG. 1 is a schematic view of the LCD in accordance with one embodiment. FIG. 2 is a cross-sectional view of the display panel of FIG. 1 along the "C-C" line. Referring to FIG. 1, the liquid crystal panel 10 includes a display panel 110 and a flexible circuit board 120. Referring to FIG. 2, the display panel 110 includes an array substrate 111, a color film substrate 112, and a liquid crystal layer 113 between the color film substrate 112 and the array substrate 111. Further, at least one pixel electrode 115 and at least one common electrode 117 are arranged on an up surface of the array substrate 111, wherein the common electrode 117 is insulated from the pixel electrode 115. A surface of the color film substrate 112 is arranged with a common electrode 116. The flexible circuit board 120 is configured for arranging the driving circuit of the display panel 110. The flexible circuit board 120 may be a chip on film (COF) flexible substrate and at least one driving chip on the flexible substrate. After the color film substrate 112, the array substrate 111, and the liquid crystal layer 113 are assembled and are bonded with the flexible circuit board 120, the CF-Vcom of the color film substrate 112 and the Array-Vcom of the array substrate 111 are disconnected. The voltage of the pixel electrode 115 of the array substrate 111 and the CF-Vcom of the color film substrate are independent signals and can be independently controllable, and thus may be adopted to realize a predetermined voltage difference for aligning the liquid crystal layer 113 between the array substrate 111 and the color film substrate 112.

The color film substrate 112, the array substrate 111, and the liquid crystal layer 113 are assembled to be one display panel 110. The display panel 110 and the flexible circuit board 120 are bonded together by fixing the display panel 110 and the flexible circuit board 120. Generally, the flexible circuit board 120 is bonded within a non-display area of the display panel 110. As shown in FIG. 1, the display area of the display panel 110 is surrounded by dashed lines, and the remaining area relates to the non-display area.

The CF-Vcom of the color film substrate 112 and the Array-Vcom of the array substrate 111 are disconnected. Specifically, the conventional transfer pad for connecting the CF-Vcom of the color film substrate 112 and the Array-Vcom of the array substrate 111 is not adopted, such that the voltage of the pixel electrode 115 of the array substrate 111 and the CF-Vcom of the color film substrate are mutually independent and can be independently controllable. This not only simplify the manufacturing process of the display panel, but also reduce the manufacturing cost.

The predetermined voltage difference for conducting the alignment of the liquid crystal layer 113 is formed between the array substrate 111 and the color film substrate 112. After the alignment of the liquid crystal layer 113 is completed, the display panel 110 and the flexible circuit board 120 are bonded. The Cf-Vcom on the color film substrate 112 and the Array-Vcom on the array substrate 111 are connected on the flexible circuit board 120 such that the LCD may display normally.

Referring to FIG. 1, the flexible circuit board 120 includes a first pin (A) and a second pin (B) connected with each other. The first pin (A) receives the Array-Vcom on the display panel 110, and the second pin (B) receives the CF-Vcom on the color film substrate 112 for connecting the CF-Vcom on the color film substrate 112 and the Array-Vcom on the array substrate 111.

Specifically, the first pin (A) and the second pin (B) of the flexible circuit board 120 are arranged after the liquid crystal layer 113 has been aligned. The Array-Vcom on the array substrate 111 and the CF-Vcom on the color film substrate 112 are connected by connecting the first pin (A) and the second pin (B).

In other embodiments, the configuration may be conducted before the alignment of the liquid crystal layer 113 and after the display panel 110 is assembled. But during the alignment process, the CF-Vcom of the color film substrate 112 and the Array-Vcom of the array substrate 111 are disconnected. Further, during the alignment process, the first pin (A) and the second pin (B) are disconnected. Alternatively, the second pin (B) is disconnected with the CF-Vcom on the color film substrate 112 such that such that the voltage of the pixel electrode 115 of the array substrate 111 and the CF-Vcom of the color film substrate are mutually independent and can be independently controllable. After the alignment process and during the bonding process, the first pin (A) and the second pin (B) are connected, or the second pin (B) and the CF-Vcom on the color film substrate 112 are connected.

Referring to FIG. 1, the flexible circuit board 120 includes a plurality of source sub-flexible circuit boards 121 and a plurality of gate sub-flexible circuit boards 122. At least one of the sub-flexible circuit boards 120 includes the first pin (A) and the second pin (B) that are connected together. As shown in FIG. 1, one source sub-flexible circuit board 121 includes the first pin (A) and the second pin (B) that are connected. In other embodiments, one gate sub-flexible circuit boards 122 is configured with connected first pin (A) and the second pin (B). In other embodiments, at least one source sub-flexible circuit boards 121 and at least one gate sub-flexible circuit boards 122 includes connected first pin (A) and the second pin (B).

Usually, the LCD 10 includes at least two source sub-flexible circuit boards 121 and at least two gate sub-flexible circuit boards 122, but the present disclosure is not limited thereto. In other embodiments, the LCD 10 may include one source sub-flexible circuit boards 121 and one gate sub-flexible circuit boards 122 when the dimension of the display panel is small.

Figure 3:
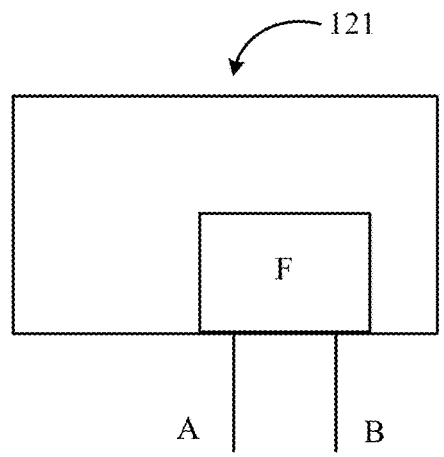
FIG. 3 is a schematic view of the first pin and the second pine of the flexible circuit board of FIG. 1.

FIG. 3 is a schematic view of the first pin and the second pine of the flexible circuit board of FIG. 1. As shown, the first pin (A) and the second pin (B) are connected via one circuit block (F). The circuit block (F) may be a wiring section such that the first pin (A) and the second pin (B) are directly connected. Alternatively, the circuit block (F) may be a resistor having no impact with respect to the level difference between the first pin (A) and the second pin (B). The circuit block (F) is configured for, after the bonding process, connecting the Array-Vcom on the display panel 110 and the CF-Vcom on the color film substrate 112 via the first pin (A) and the second pin (B).

In other embodiments, the circuit block (F) may be a circuit having electronic components. For instance, the electronic components may be triode or a combination of the triode, resistor, and the capacitor. The triode may be a transistor for connecting or disconnecting the source and the drain in accordance with the level of the gate.

One of the source and the drain of the triode connects to the first pin (A), and the other one connects to the second pin (B). During the alignment process, which is after the display panel 110 is assembled and before the display panel 110 and the flexible circuit board 120 are bonded, the triode is configure to be in an off-state, regardless whether the second pin (B) has received the CF-Vcom on the color film substrate 112. With such configuration, the Array-Vcom of the display panel 110 connected by the first pin (A) is disconnected with the CF-Vcom on the color film substrate 112 connected by the second pin (B). As such, the voltage of the pixel electrode 115 of the array substrate 111 and the CF-Vcom of the color film substrate are mutually independent and can be independently controllable to form the predetermined voltage difference suitable for the alignment of the liquid crystal layer. After the alignment process and the bonding process, the triode is configured to be in an on-state. That is, the source and the drain are connected such that the first pin (A) and the second pin (B) are connected. In this way, the Array-Vcom of the display panel 110 connected with the first pin (A) is connected with the CF-Vcom on the color film substrate 112 via the second pin (B).

Figure 4:
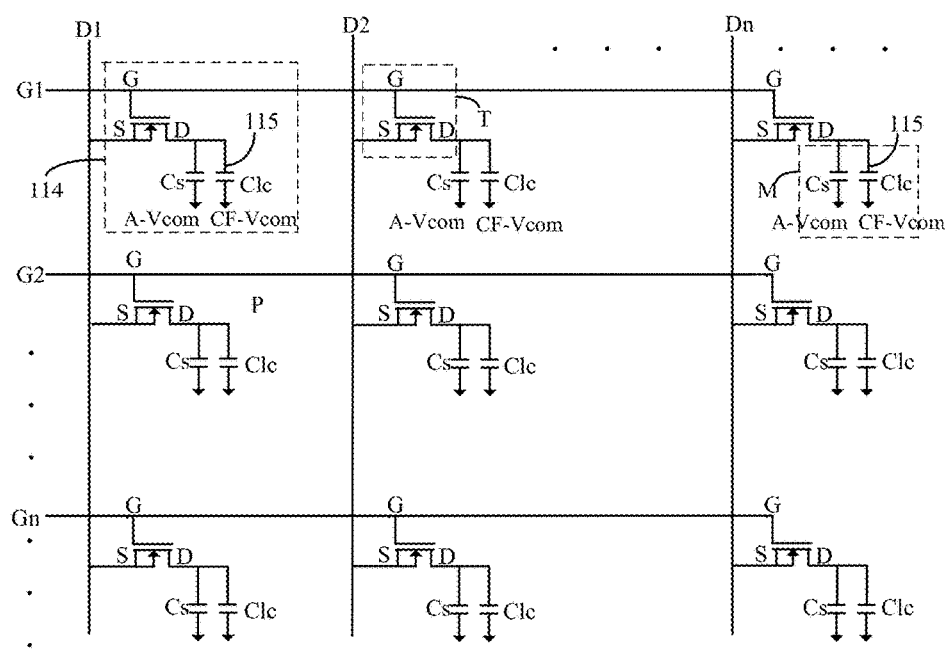
FIG. 4 is an equivalent circuit view of the display panel having a plurality of sub-pixel cells of FIG. 1.

FIG. 4 is an equivalent circuit view of the display panel having a plurality of sub-pixel cells of FIG. 1. As shown in FIG. 4, the display panel 110 includes a plurality of sub-pixel units 114, a plurality of data line arranged along the column direction and a plurality of scanning lines arranged along the row direction. In FIG. 4, Dn relates to the n-th data line, Gn relates to the n-th scanning line, n is an integer, and wherein each of the sub-pixel units 114 includes a pixel field effect transistor (T) and a capacitance sub-unit M. The pixel field effect transistor (T) includes a gate (G), a source (S) and a drain (D). The gate (G) connects the corresponding scanning line to receive the driving signals on the gate sub-flexible circuit boards 122 of corresponding column, and the source (S) connects to the corresponding data line to receive the driving signals on the source sub-flexible circuit boards 121 of corresponding row. The capacitance sub-unit M includes a liquid crystal capacitor (Clc) and a storage capacitor (Cs) formed by the liquid crystal molecules within the liquid crystal layer 113, and the liquid crystal capacitor (Clc) and the controllable switch stands side by side. The same ends of the liquid crystal capacitor (Clc) and the controllable switch within each of the pixel field effect transistors (T) connect to the drain (D) of the corresponding field effect transistor (T). Specifically, the drain (D) of the field effect transistor (T) connects to the pixel electrode 115, as shown in FIG. 2, such that one end of the liquid crystal capacitor (Clc) connects to the pixel electrode 115, and the other end of the liquid crystal capacitor (Clc) connects to the common electrode 116 of the color film substrate 112 so as to receive the CF-Vcom of the color film substrate 112. The other end of the controllable switch connects to the common electrode 117 of the array substrate 111 to receive the Array-Vcom of the array substrate 111, i.e., A-Vcom in FIG. 4. Before the assembled display panel 110 is bonded with the flexible circuit board 120, the gate (G) of the field effect transistor (T) within each of the sub-pixel units 114 is turned on by the gate sub-flexible circuit boards 122. In addition, the corresponding source sub-flexible circuit boards 121 input the first voltage to the corresponding data line such that the source (S) of the field effect transistor (T) within the sub-pixel units 114 includes the first voltage. At the same time, the CF-Vcom on the color film substrate 112 receives the second voltage so as to form the predetermined AC voltage difference between the drain (D) of each of the field effect transistor (T) and the color film substrate 112.

The array substrate 111 on the display panel 110 includes the plurality of data lines arranged along the column direction, the plurality of scanning lines arranged along the row direction, the field effect transistor (T)s and the pixel electrode 115 arranged within the area defined by adjacent data line and the scanning line. Each of the field effect transistor (T) includes a gate (G), a source (S) and a drain (D). The gate (G) connects the corresponding scanning line to receive the driving signals on the gate sub-flexible circuit boards 122 of corresponding column, the source (S) connects to the corresponding data line to receive the driving signals on the source sub-flexible circuit boards 121 of corresponding row, and the drain (D) connects to the corresponding pixel electrode 115. The liquid crystal molecules within the liquid crystal layer 113 form the liquid crystal capacitor (Clc). One end of the liquid crystal capacitor (Clc) connects to the pixel electrode 115, and the other end of the liquid crystal capacitor (Clc) connects to the CF-Vcom on the color film substrate 112. After the color film substrate 112, the array substrate 111, and the liquid crystal layer 113 are assembled and before bonding with the flexible circuit board 120, the gate (G) of each of the field effect transistor (T) are turns on by the gate sub-flexible circuit boards 122, and the first voltage is inputted to the corresponding data line via the corresponding source sub-flexible circuit boards 121. In this way, the source (S) of the field effect transistor (T) connected by the data line includes the first voltage, and the drain (D) of the corresponding field effect transistor (T) also includes the first voltage. As such, the corresponding pixel electrode 115 includes the first voltage. At the same time, the second voltage is inputted to the CF-Vcom on the color film substrate 112 such that the predetermined AC voltage is formed at two ends of the liquid crystal layer 113.

It can be understood that the signals on the common electrode 116 of the color film substrate 112 are directed to the CF-Vcom on the color film substrate 112, the signals on the common electrode 117 of the array substrate 111 are directed to the Array-Vcom of the array substrate 111, which may be generated by the driving signals passing or applying to the data line from an external circuit.

Figure 5:
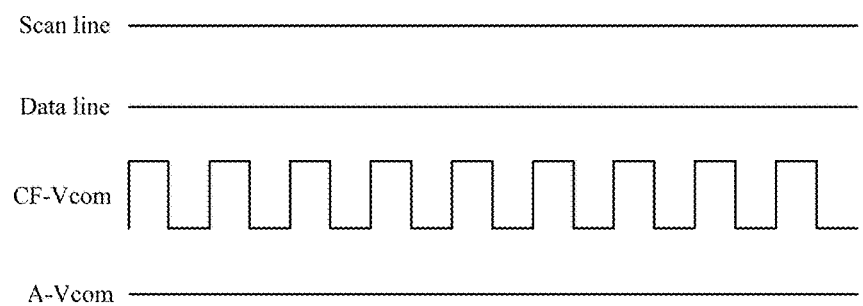
FIG. 5 is a timing diagram of the predetermined alternating voltage (AC voltage) difference in the liquid crystal layer of FIG. 4.

FIG. 5 is a timing diagram of the predetermined alternating voltage (AC voltage) difference in the liquid crystal layer of FIG. 4. As shown in FIG. 5, the first voltage is a grounded zero voltage, and the second voltage is the AC voltage. The gate sub-flexible circuit boards 122 apply AC voltage to the scanning lines along the row direction, which is referred to as Scan line in FIG. 5, the gate (G) of the field effect transistor (T) within each of the liquid crystal layer 113 is turned on. The grounded zero voltage is applied to the corresponding data line, which is referred to as Data line in FIG. 5. At this moment, the pixel electrode 115 also includes the grounded zero voltage. The self-adjust Vcom LCD transmits the signals on the data line to the common electrode 117 of the array substrate 111. At this moment, the Array-Vcom is also the grounded zero voltage. When the common electrode 116 of the color film substrate 112 applies the AC voltage as the CF-Vcom, the AC voltage difference exists between the two ends of the liquid crystal layer 113, i.e., between the pixel electrode 115 and the common electrode 116 of the color film substrate 112. In this way, the liquid crystal molecules within the liquid crystal layer 113 may be aligned in accordance with the pretile angel, and thus the alignment of the liquid crystal layer may be cured under appropriate radiation.

In other embodiments, the first voltage may be AC voltage, and the second voltage may be grounded zero voltage. However, the first voltage and the second voltage may be of other voltage signals capable of forming the predetermined AC voltage difference suitable for the alignment of liquid crystal layer.

Figure 6:
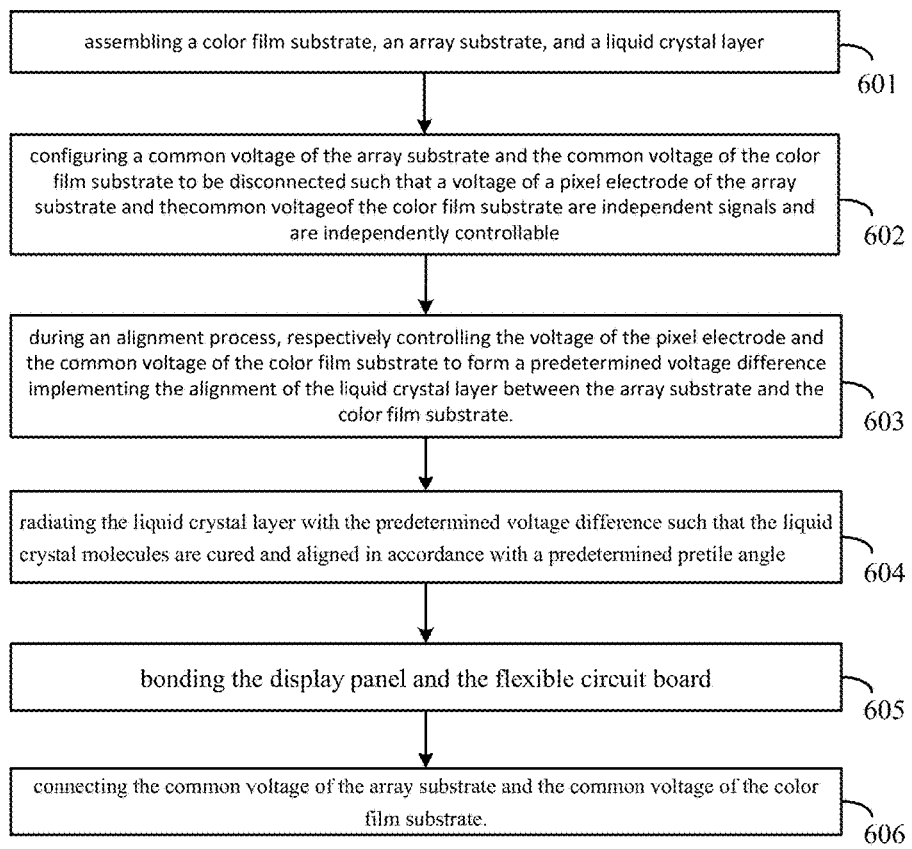
FIG. 6 is a flowchart illustrating the manufacturing method of the LCD in accordance with one embodiment.

FIG. 6 is a flowchart illustrating the manufacturing method of the LCD in accordance with one embodiment. The manufacturing method includes the following steps.

In block 601, the color film substrate, the array substrate and the liquid crystal layer are assembled to be one display panel.

In block 602, the common voltage on the array substrate and the common voltage on the color film substrate are configured to be disconnected. As such, the voltage of the pixel electrode of the array substrate and the common voltage of the color film substrate are independent signals and can be independently controllable.

In block 603, before the alignment process, the voltage of the pixel electrode and the common voltage of the color film substrate are controlled so as to form the predetermined voltage difference implementing the alignment of the liquid crystal layer between the array substrate and the color film substrate.

In the embodiment, the structure of the LCD is the same with the above LCD 10 in the first embodiment, and the steps 601 to 603 may be executed by the components of the above LCD 10.

In block 602, the common voltage on the array substrate and the common voltage on the color film substrate are configured to be disconnected, wherein the transfer pad is not provided on the display panel.

After the block 603, the manufacturing method further includes the following steps.

In block 604, radiating the liquid crystal layer with the predetermined voltage difference such that the liquid crystal molecules are cured and aligned in accordance with the predetermined pretile angle.

In block 605, the display panel and the flexible circuit board are bonded.

In block 606, the common voltage of the array substrate and the common voltage of the color film substrate are connected.

Figure 7:
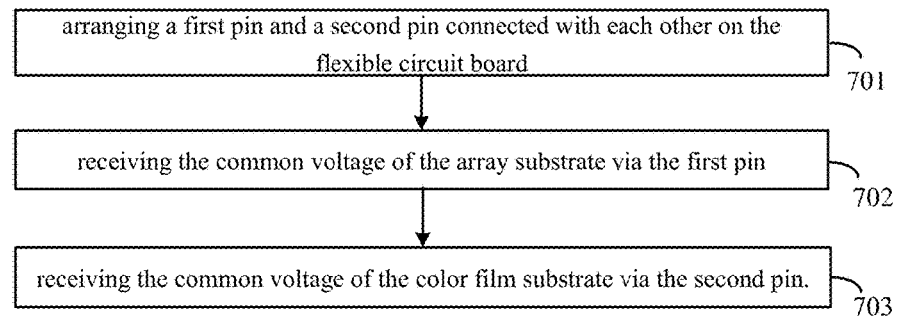
FIG. 7 is a flowchart illustrating the steps of connecting the common voltage on the array substrate and the common voltage on the color film substrate of FIG. 6.

FIG. 7 is a flowchart illustrating the steps of connecting the common voltage on the array substrate and the common voltage on the color film substrate of FIG. 6. As shown in FIG. 7, the block 606 further includes the following steps.

In block 701, the first pin and the second pin connected with each other are arranged on the flexible circuit board.

In block 702, the first pin receives the common voltage of the array substrate.

In block 703, the second pin receives the common voltage of the color film substrate.

Specifically, in the block 701, the circuit block is arranged on the flexible circuit board to connect the first pin and the second pin. Further, the circuit block may be a wiring section such that the first pin and the second pin are directly connected. Alternatively, the circuit block may be a transistor, such as a triode, or a circuit having electronic components to connect the first pin and the second pin. Thus, in block 701, the first pin and the second pin are connected.

In other embodiments, when the first pin (A) and second pin (B) are indirectly connected, the blocks 701 to 703 may be executed before the block 605, such as in the block 602. At this moment, the first pin and the second pin are disconnected by the transistor, such as triode. This is the concrete configuration, in block 602, for disconnecting the common electrode of the array substrate and the common voltage of the color film substrate. In block 606, the first pin and the second pin are connected such that the common voltage of the array substrate and the common voltage of the color film substrate are connected. The detailed technical contents may be referenced to the first embodiment, and thus are omitted hereinafter.

The block 701 further includes the following steps.

The flexible circuit board includes a plurality of source sub-flexible circuit boards and gate sub-flexible circuit boards.

At least one of the source sub-flexible circuit boards and the gate sub-flexible circuit boards includes the first pin and the second pin that are connected with each other.

The block 603 further includes the following steps.

The gate sub-flexible circuit boards turns on the gate of each of the FETs on the array substrate.

The source sub-flexible circuit boards apply the first input to the corresponding data line of the FETs such that the voltage of the pixel electrode connected with the FET is the first voltage. At the same time, the common voltage of the color film substrate receives the second voltage to form the predetermined AC voltage difference on the liquid crystal layer.

In other embodiments, the first voltage may be AC voltage, and the second voltage may be grounded zero voltage. However, the first voltage and the second voltage may be of other voltage signals capable of forming the predetermined AC voltage difference suitable for the alignment of liquid crystal layer.

In view of the above, after the color film substrate, the array substrate, and the liquid crystal layer are assembled and before being bonded with the flexible circuit board, the common voltage of the color film substrate and the common voltage of the array substrate are disconnected. The voltage of the pixel electrode of the array substrate and the CF-Vcom of the color film substrate are independent signals and can be independently controllable, and thus may be adopted to realize a predetermined voltage difference for aligning the liquid crystal layer between the array substrate and the color film substrate. Further, after the alignment process, the display panel and the flexible circuit board are bonded, the common voltage of the color film substrate and the common voltage of the array substrate are connected so as to normally display. Compared to the conventional technology, after the liquid crystal panel is assembled and before the flexible circuit board are bonded, the voltage of the pixel electrode of the array substrate and the CF-Vcom of the color film substrate are independent signals and can be independently controllable, and thus may be adopted to realize a predetermined voltage difference for aligning the liquid crystal layer between the array substrate and the color film substrate. In this way, the display performance is enhanced.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A liquid crystal device (LCD), comprising:
a display panel and a flexible circuit board, the display panel comprises a color film substrate, an array substrate, and a liquid crystal layer between the color film substrate and the array substrate, the flexible circuit board is configured for arranging the driving circuit, at least one pixel electrode and at least one common electrode are arranged on an up surface of the array substrate, wherein the common electrode is insulated from the pixel electrode, a surface of the color film substrate is arranged with a common electrode, after the color film substrate, the array substrate, and the liquid crystal layer are assembled and before the flexible circuit board is bonded, a common voltage of the color film substrate and the common voltage of the array substrate are disconnected, a voltage of the pixel electrode of the array substrate and the common voltage of the color film substrate are independent signals and are independently controllable to form a predetermined voltage difference for aligning the liquid crystal layer between the array substrate and the color film substrate;
wherein the predetermined voltage difference for aligning the liquid crystal layer is formed between the array substrate and the color film substrate, after the liquid crystal layer is aligned and the display panel is bonded, the common voltage of the color film substrate and the common voltage of the array substrate are connected; and
wherein the flexible circuit board comprises a first pin and a second pin, the first pin receives the common voltage of the array substrate, and the second pin receives the common voltage of the color film substrate, after the flexible circuit board is bonded, the common voltage of the color film substrate and the common voltage of the array substrate are connected.

2. The LCD as claimed in claim 1, wherein the flexible circuit board comprises a plurality of source sub-flexible circuit boards and a plurality of gate sub-flexible circuit boards, at least one of the sub-flexible circuit boards comprises interconnecting first pin and the second pin.

3. The LCD as claimed in claim 2, wherein the array substrate comprises a plurality of pixel field effect transistors and a plurality of pixel electrodes arranged in a matrix defined by a column direction and a row direction, a plurality of data lines arranged along the column direction and a plurality of scanning lines arranged along the row direction, each of the pixel field effect transistors comprises a gate, a source, and a drain, the gate connects the corresponding scanning line to receive driving signals on the gate sub-flexible circuit boards of corresponding column, the source connects to the corresponding data line to receive the driving signals on the source sub-flexible circuit boards of corresponding row, and the drain connects to the corresponding pixel electrode, wherein the liquid crystal molecules within the liquid crystal layer between the pixel electrode and the color film substrate form at least one liquid crystal capacitor, one end of the liquid crystal capacitor connects to the pixel electrode, the other end of the liquid crystal capacitor receives the common voltage of the color film substrate, after the color film substrate, the array substrate, and the liquid crystal layer are assembled and before bonding with the flexible circuit board, the gate of each of the field effect transistors are turned on by the gate sub-flexible circuit boards, and the first voltage is inputted to the corresponding data line via the corresponding source sub-flexible circuit boards, such that the voltage of the corresponding pixel electrode is the first voltage, at the same time, the second voltage is inputted to the common voltage on the color film substrate such that the predetermined AC voltage is formed at two ends of the liquid crystal layer.

4. A liquid crystal device (LCD), comprising:
a display panel and a flexible circuit board, the display panel comprises a color film substrate, an array substrate, and a liquid crystal layer between the color film substrate and the array substrate, the flexible circuit board is configured for arranging the driving circuit, after the color film substrate, the array substrate, and the liquid crystal layer are assembled and before the flexible circuit board is bonded, a common voltage of the color film substrate and the common voltage of the array substrate are disconnected, a voltage of the pixel electrode of the array substrate and the common voltage of the color film substrate are independent signals and are independently controllable to form a predetermined voltage difference for aligning the liquid crystal layer between the array substrate and the color film substrate;
wherein the predetermined voltage difference for aligning the liquid crystal layer is formed between the array substrate and the color film substrate, after the liquid crystal layer is aligned and the display panel is bonded, the common voltage of the color film substrate and the common voltage of the array substrate are connected; and
wherein the flexible circuit board comprises a first pin and a second pin, the first pin receives the common voltage of the array substrate, and the second pin receives the common voltage of the color film substrate, after the flexible circuit board is bonded, the common voltage of the color film substrate and the common voltage of the array substrate are connected.

5. The LCD as claimed in claim 4, wherein the flexible circuit board comprises a plurality of source sub-flexible circuit boards and a plurality of gate sub-flexible circuit boards, at least one of the sub-flexible circuit boards comprises interconnecting first pin and the second pin.

6. The LCD as claimed in claim 5, wherein the array substrate comprises a plurality of pixel field effect transistors and a plurality of pixel electrodes arranged in a matrix defined by a column direction and a row direction, a plurality of data lines arranged along the column direction and a plurality of scanning lines arranged along the row direction, each of the pixel field effect transistors comprises a gate, a source, and a drain, the gate connects the corresponding scanning line to receive driving signals on the gate sub-flexible circuit boards of corresponding column, the source connects to the corresponding data line to receive the driving signals on the source sub-flexible circuit boards of corresponding row, and the drain connects to the corresponding pixel electrode, wherein the liquid crystal molecules within the liquid crystal layer between the pixel electrode and the color film substrate form at least one liquid crystal capacitor, one end of the liquid crystal capacitor connects to the pixel electrode, the other end of the liquid crystal capacitor receives the common voltage of the color film substrate, after the color film substrate, the array substrate, and the liquid crystal layer are assembled and before bonding with the flexible circuit board, the gate of each of the field effect transistors are turned on by the gate sub-flexible circuit boards, and the first voltage is inputted to the corresponding data line via the corresponding source sub-flexible circuit boards, such that the voltage of the corresponding pixel electrode is the first voltage, at the same time, the second voltage is inputted to the common voltage on the color film substrate such that the predetermined AC voltage is formed at two ends of the liquid crystal layer.

7. A manufacturing method of the LCDs, comprising:
   assembling a color film substrate, an array substrate, and a liquid crystal layer;
   configuring a common voltage of the array substrate and the common voltage of the color film substrate to be disconnected such that a voltage of a pixel electrode of the array substrate and the common voltage of the color film substrate are independent signals and are independently controllable; and
   during an alignment process, respectively controlling the voltage of the pixel electrode and the common voltage of the color film substrate to form a predetermined voltage difference implementing the alignment of the liquid crystal layer between the array substrate and the color film substrate;
   wherein after the step of forming the predetermined voltage difference implementing the alignment of the liquid crystal layer between the array substrate and the color film substrate, the method further comprises:
   radiating the liquid crystal layer with the predetermined voltage difference such that the liquid crystal molecules are cured and aligned in accordance with a predetermined pretile angle;
   bonding the display panel and the flexible circuit board; and
   connecting the common voltage of the array substrate and the common voltage of the color film substrate.

8. The manufacturing method as claimed in claim 7, wherein the step of the connecting the common voltage of the array substrate and the common voltage of the color film substrate further comprises:
   arranging a first pin and a second pin connected with each other on the flexible circuit board;
   receiving the common voltage of the array substrate via the first pin; and
   receiving the common voltage of the color film substrate via the second pin.

9. The manufacturing method as claimed in claim 8, wherein the step of arranging the first pin and the second pin connected with each other on the flexible circuit board further comprises:
   configuring the flexible circuit board to include a plurality of source sub-flexible circuit boards and gate sub-flexible circuit boards; and
   configuring at least one of the source sub-flexible circuit boards and the gate sub-flexible circuit boards to include the first pin and the second pin that are connected with each other.

10. The manufacturing method as claimed in claim 9, wherein the step of respectively controlling the voltage of the pixel electrode and the common voltage of the color film substrate to form a predetermined voltage difference implementing the alignment of the liquid crystal layer between the array substrate and the color film substrate further comprises:
   turning on gates of each of the pixel FETS on the array substrate by the gate sub-flexible circuit boards; and
   inputting a first voltage to the corresponding data line of the pixel FET by the source sub-flexible circuit boards such that the voltage of the pixel electrode connected with the pixel FET is the first voltage, at the same time, the common voltage of the color film substrate receives the second voltage to form a predetermined AC voltage on the liquid crystal layer.

\* \* \* \* \*